(12) United States Patent  
Sato et al.

(10) Patent No.: US 10,914,379 B2
(45) Date of Patent: Feb. 9, 2021

(54) DUST COVER

(71) Applicant: NOK CORPORATION, Tokyo (JP)

(72) Inventors: Noriaki Sato, Fujisawa (JP); Takuma Hirota, Makinohara (JP)

(73) Assignee: NOK CORPORATION

(*) Notice: Subject to any disclaimer, the term of this patent is extended or adjusted under 35 U.S.C. 154(b) by 85 days.

(21) Appl. No.: 16/330,656

(22) PCT Filed: Sep. 14, 2017

(86) PCT No.: PCT/JP2017/033221
§ 371 (c)(1),
(2) Date: Mar. 5, 2019

(87) PCT Pub. No.: WO2018/056159
PCT Pub. Date: Mar. 29, 2018

(65) Prior Publication Data
US 2019/0226581 A1 Jul. 25, 2019

(30) Foreign Application Priority Data

Sep. 21, 2016 (JP) .................................. 2016-184047

(51) Int. Cl.
*F16J 3/04* (2006.01)
*F16J 15/52* (2006.01)
*F16C 11/06* (2006.01)

(52) U.S. Cl.
CPC ........... *F16J 3/046* (2013.01); *F16C 11/0671* (2013.01); *F16J 15/52* (2013.01); *F16J 3/04* (2013.01); *F16J 3/042* (2013.01)

(58) Field of Classification Search
CPC ...... F16C 11/0671; F16J 15/3244; F16J 15/52; F16J 3/04; F16J 3/042; F16J 3/046
See application file for complete search history.

(56) References Cited

U.S. PATENT DOCUMENTS 2,559,857 A * 7/1951 Edwards ............. F16C 11/0604
403/134
5,496,047 A 3/1996 Goldswain et al.
(Continued)

FOREIGN PATENT DOCUMENTS

CN 104520617 A 4/2015
JP S62-43869 U 3/1987
(Continued)

*Primary Examiner* — Nicholas L Foster
(74) *Attorney, Agent, or Firm* — Harness, Dickey & Pierce, P.L.C.

(57) ABSTRACT

A dust cover is provided that is attached to a ball joint in which a spherical portion in a stud having the spherical portion and a shaft is accommodated in a socket and a knuckle is fastened into the shaft and is provided with a large diameter opening fixed to the outer peripheral surface of the socket, a small diameter opening attached to the shaft part of the stud, and a film portion connecting the large diameter opening and the small diameter opening. The small diameter opening is provided with a seal portion in close contact with the outer peripheral surface of the shaft and a contact portion in close contact with the knuckle. In the contact portion, a foreign matter discharge groove discharging external foreign matter which tends to accumulate on the small diameter opening to the outside are formed.

6 Claims, 9 Drawing Sheets

(56) References Cited

U.S. PATENT DOCUMENTS

| | | | | |
|---|---|---|---|---|
| 6,308,959 | B1* | 10/2001 | Sokolihs | F16J 3/046 |
| | | | | 277/394 |
| 6,789,805 | B2* | 9/2004 | Sassi | F16J 15/3256 |
| | | | | 277/549 |
| 8,348,541 | B2* | 1/2013 | Mahlmann | B62D 7/163 |
| | | | | 403/122 |
| 9,206,837 | B2* | 12/2015 | Ishimori | F16J 15/52 |
| 10,267,422 | B2* | 4/2019 | Yamaguchi | F16J 15/164 |
| 10,352,450 | B2* | 7/2019 | Yamanaka | F16J 15/3456 |
| 10,683,935 | B2* | 6/2020 | Yamanaka | F16J 15/3256 |
| 2003/0202842 | A1* | 10/2003 | Abels | F16C 11/0671 |
| | | | | 403/134 |
| 2009/0127791 | A1* | 5/2009 | Buro | F16J 15/3256 |
| | | | | 277/352 |
| 2009/0208273 | A1* | 8/2009 | Mahlmann | B62D 7/163 |
| | | | | 403/134 |
| 2009/0289424 | A1 | 11/2009 | Fella et al. | |
| 2015/0285380 | A1* | 10/2015 | Nakagawa | F16J 15/002 |
| | | | | 277/351 |
| 2018/0023707 | A1* | 1/2018 | Yamaguchi | F16J 15/3244 |
| | | | | 277/400 |
| 2018/0038485 | A1* | 2/2018 | Yamanaka | F16J 15/3264 |
| 2018/0038486 | A1* | 2/2018 | Yamanaka | F16J 15/3256 |
| 2018/0372148 | A1* | 12/2018 | Hirota | F16C 11/0642 |

FOREIGN PATENT DOCUMENTS

| | | |
|---|---|---|
| JP | H08-200517 A | 8/1996 |
| JP | H11-063245 A | 3/1999 |
| JP | H11-108044 A | 4/1999 |
| JP | 2003-172334 A | 6/2003 |
| JP | 2006-275259 A | 10/2006 |
| JP | 2007-278352 A | 10/2007 |

* cited by examiner

DUST COVER

CROSS REFERENCE TO RELATED APPLICATIONS

This application is a U.S. National Stage application of International Application No. PCT/JP2017/033221 filed on Sep. 14, 2017 and published in Japanese as WO 2018/056159 on Mar. 29, 2018 and claims priority to Japanese Patent Application No. 2016-184047 filed on Sep. 21, 2016. The entire disclosures of the above applications are expressly incorporated by reference herein.

BACKGROUND

Technical Field

The present invention relates to a dust cover attached to a ball joint.

Related Art

Heretofore, to a ball joint, a dust cover preventing the intrusion of external foreign matter, such as muddy water or dust, into the ball joint and preventing grease charged into internal space of the ball joint from flowing out to the outside has been attached.

As the ball joint to which the dust cover is attached, a so-called taper alignment ball joint which is not illustrated and a so-called pinch bolt ball joint 550 illustrated in FIG. 8 and FIG. 9 are known.

The taper alignment ball joint is structured so that a shaft is passed through a knuckle, and then the knuckle is tightened with a nut from above thereof, whereby the knuckle is fixed to a stud.

The pinch bolt ball joint 550 is configured so that a notch 553a reaching an insertion hole 553e for passing through a shaft 551b from an end portion on the outer peripheral side of the knuckle 553 is provided and a gap C of the notch 553a is fastened by a nut 554a and a bolt 554b, whereby the knuckle 553 is fixed to the stud 551 as illustrated in FIG. 8 and FIG. 9.

However, the gap C is formed in a part of a lower side surface 553c of the knuckle 553 in the pinch bolt ball joint 550 as illustrated in FIG. 9.

Therefore, a dust cover 510 to which the pinch bolt ball joint 550 is attached is not provided with a dust lip which is supposed to be in close contact with the lower side surface 553c of the knuckle 553 with no gap, so that there is a possibility that external foreign matter intrudes between the knuckle 553 and a large diameter opening 530 from the gap C of the notch 553a.

Thus, there has been a possibility that the intruding external foreign matter or rust of the knuckle 553 accumulates between the knuckle 553 and the large diameter opening 530, and then a seal portion 532 in the large diameter opening 530 contacts the accumulating external foreign matter or rust of the knuckle 553 to wear out, so that the seal portion 532 cannot seal internal space S of the dust cover over the long period of time.

The present invention has been made in view of the above-described points. It is a technical object of the present invention to provide a dust cover which can prevent the accumulation of external foreign matter or rust of a knuckle between the knuckle and a large diameter opening, and thus prevent wear of a seal portion caused by a contact with the accumulating external foreign matter or rust of the knuckle.

SUMMARY OF THE INVENTION

As a measure for solving the technical problem described above, a dust cover of the present invention which is attached to a ball joint in which a spherical portion in a stud having the spherical portion and a shaft is accommodated in a socket and a knuckle is fastened into the shaft is provided with a large diameter opening fixed to the outer peripheral surface of the socket, a small diameter opening attached to the shaft of the stud, and a film portion connecting the large diameter opening and the small diameter opening, in which the small diameter opening is provided with a seal portion in close contact with the outer peripheral surface of the shaft and a contact portion in close contact with the knuckle, and a foreign matter discharge groove discharging external foreign matter which tends to accumulate on the small diameter opening to the outside are formed in the contact portion.

In the present invention, the foreign matter discharge groove is preferably disposed obliquely in the radial direction.

In the present invention, the foreign matter discharge groove preferably has a spiral shape from the inner diameter direction to the outer diameter direction.

In the present invention, an inclined portion inclined from the side of an outer diameter of the contact portion to the side of the large diameter opening is preferably formed in the small diameter opening.

Effect of the Invention

According to the dust cover of the present invention, external foreign matter or rust of the knuckle which tends to intrude from the outside is discharged to the outside by the foreign matter discharge groove. Therefore, the accumulation of the external foreign matter or the rust of the knuckle between the knuckle and the large diameter opening can be prevented, and thus the wear of the seal portion caused by the contacting with the accumulating foreign matter or rust of the knuckle can be prevented.

DETAILED DESCRIPTION OF THE PREFERRED EMBODIMENTS

Hereinafter, a dust cover 10 according to a first embodiment of the present invention is described in detail with reference to the drawings.

Figure 1:
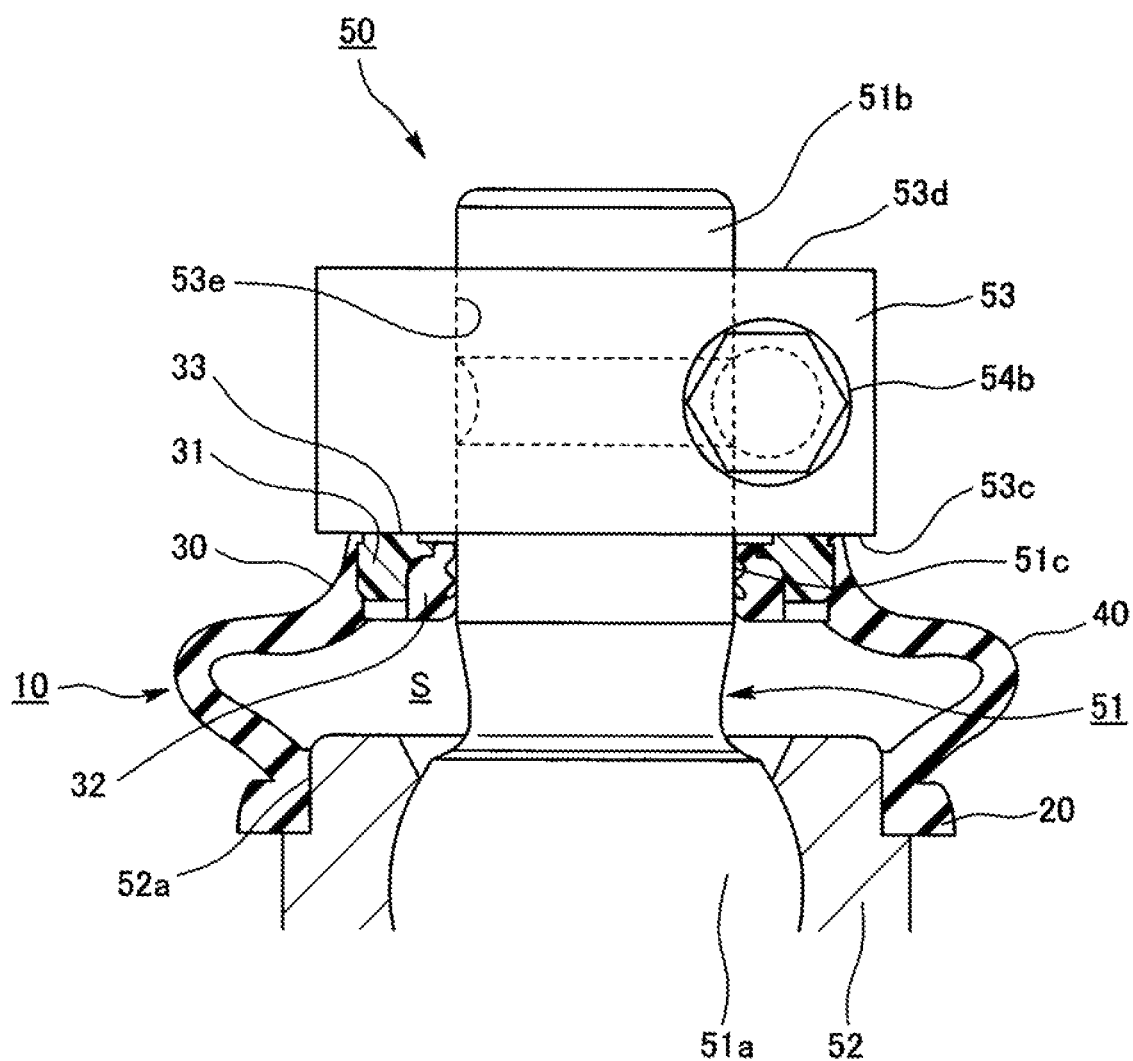
FIG. 1 is a cross-sectional view illustrating an attachment state of a dust cover according to a first embodiment of the present invention.
Figure 2:
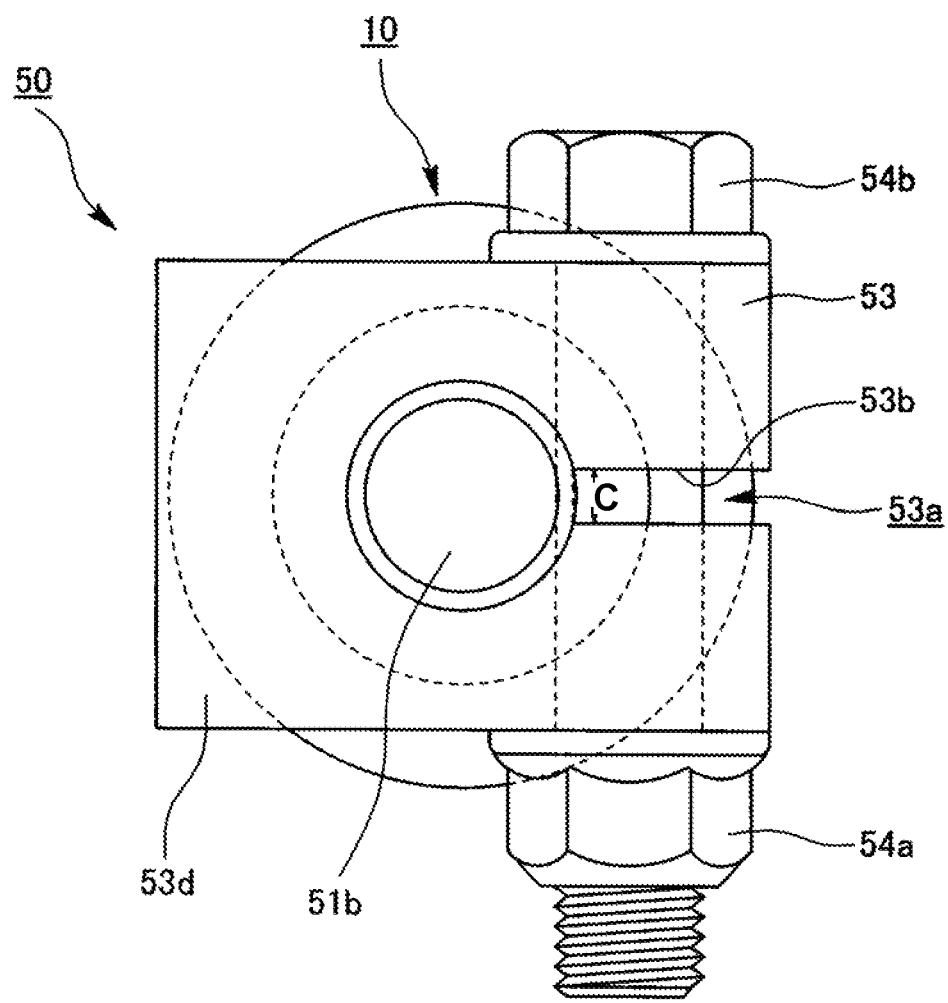
FIG. 2 is a plan view illustrating the attachment state of the dust cover according to the first embodiment of the present invention.

A pinch bolt ball joint 50 (hereinafter simply referred to as "ball joint 50") to which the dust cover 10 is attached is provided with a stud 51 having a spherical portion 51a formed in one end and a shaft 51b formed in the other end, a socket 52 turnably holding the spherical portion 51a of the stud 51, and a knuckle 53 fixed to the stud 51 as illustrated in FIG. 1 and FIG. 2.

In the knuckle 53, an insertion hole 53e for passing through the shaft 51b is formed. Moreover, in the knuckle 53, a notch 53a reaching the insertion hole 53e from an end portion on the outer peripheral side of the knuckle 53 is formed from an upper side surface 53d to a lower side surface 53c of the knuckle 53, and thus a gap C is formed in one end of the knuckle 53 as illustrated in FIG. 2. Then, the shaft 51b is passed through the knuckle 53 and the notch 53a is fastened by a nut 54a and a bolt 54b, whereby the knuckle 53 is fixed to the stud 51. To the above-described ball joint 50, the dust cover 10 according to this embodiment is attached.

The dust cover 10 is molded by a rubber-like elastic material (rubber material or synthetic resin material having rubber-like elasticity) and is provided with a large diameter opening 20 having a relatively large diameter tightened and fixed to the outer peripheral surface of the socket 52 of the ball joint 50, a small diameter opening 30 having a relatively small diameter attached to an outer peripheral surface 51c of the shaft 51b of the stud 51 in a close contact state, and a cylindrical film portion 40 connecting the large diameter opening 20 and the small diameter opening 30 as illustrated in FIG. 1.

In the large diameter opening 20, the inner peripheral surface is fitted to an annular level difference portion 52a formed on the outer peripheral surface of the socket 52 with appropriate interference by a snap ring, which is not illustrated, attached to an annular groove in the outer periphery.

Figure 3:
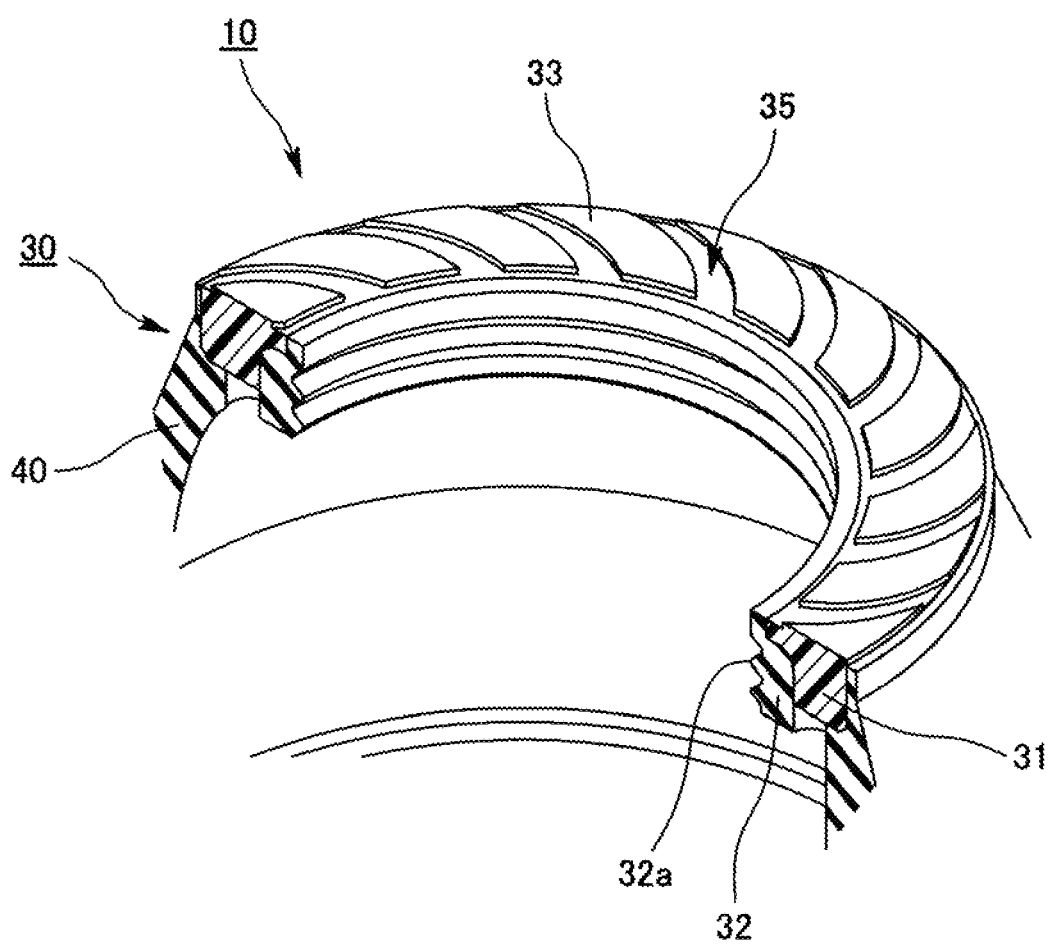
FIG. 3 is a cross-sectional perspective view of the dust cover according to the first embodiment of the present invention.
Figure 4:
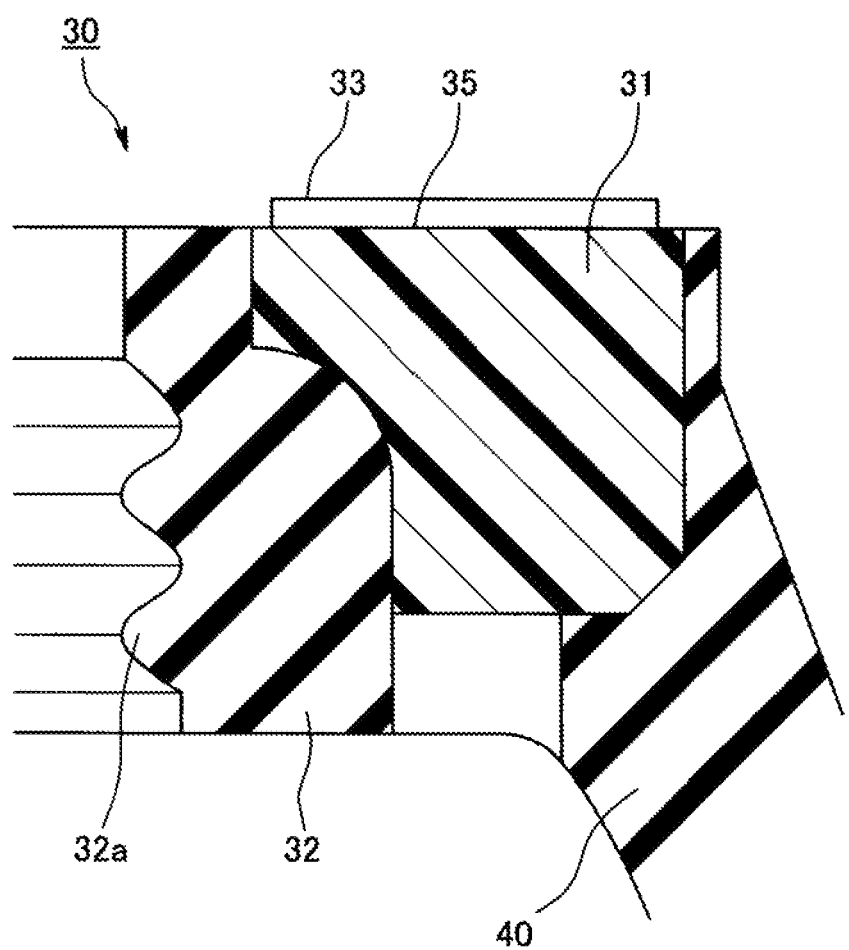
FIG. 4 is an enlarged cross-sectional view of a principal portion of a small diameter opening in the dust cover according to the first embodiment of the present invention.

The small diameter opening 30 is provided with a seal portion 32 formed on the inner peripheral side, a reinforcing ring 31 located on the outer peripheral side of the seal portion 32, and a contact portion 33 which is the upper surface of the reinforcing ring 31 and contacts a lower side surface 53c of the knuckle 53 as illustrated in FIG. 1, FIG. 3, and FIG. 4.

The seal portion 32 is in close contact with the outer peripheral surface 51c of the stud 51 with appropriate interference and a plurality of seal projections 32a is formed in an end portion on the inner peripheral side of the seal portion 32.

The reinforcing ring 31 is molded by a resin material so that the contact portion 33 formed on the upper surface is not scraped by the contact with the lower side surface 53c of the knuckle 53. Moreover, the seal portion 32 is integrally molded on the inner peripheral side of the reinforcing ring 31 and the film portion 40 is integrally molded on the outer peripheral side thereof. A material of the reinforcing ring 31 is not limited to the resin material and may also be a metal material.

The contact portion 33 is provided on the reinforcing ring 31 and contacts the lower side surface 53c of the knuckle 53. In the contact portion 33, a plurality of foreign matter discharge grooves 35 is molded from the inner peripheral side to the outer peripheral side.

Figure 5:
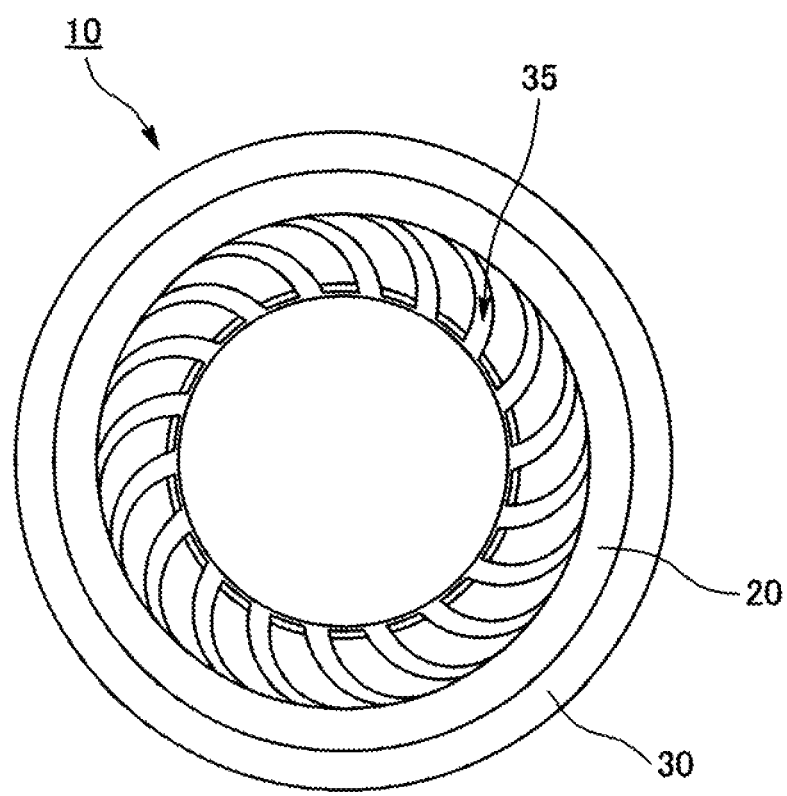
FIG. 5 is a plan view illustrating a foreign matter discharge groove in the dust cover according to the first embodiment of the present invention.

The plurality of foreign matter discharge grooves 35 is disposed obliquely with a necessary angle in the radial direction of the shaft 51b passed through the insertion hole 53e, extends while being curved from the inner peripheral side to the outer peripheral side, and has a spiral shape as a whole as illustrated in FIG. 3 and FIG. 5.

The dust cover 10 having the above-described configuration prevents grease, which is not illustrated, charged into internal space S of the dust cover 10 from flowing out to the outside and prevents external foreign matter from intruding into the internal space S of the dust cover 10 due to the fact that the large diameter opening 20 is fitted to the socket 52 and the seal portion 32 of the small diameter opening 30 is in close contact with the outer peripheral surface 51c of the stud 51 as illustrated in FIG. 1.

Moreover, according to the dust cover 10 having the above-described configuration, the film portion 40 is freely deformed as the stud 51 swings to the socket 52.

Moreover, the dust cover 10 of the above-described configuration discharges external foreign matter or rust of the knuckle 53 which tends to intrude into the internal space S of the dust cover 10 from the gap C formed by the notch 53a of the knuckle 53 to the outside by the foreign matter discharge grooves 35. When described in detail, even when the external foreign matter or the rust of the knuckle 53 tends to accumulate on the seal portion 32 from the gap C formed by the notch 53a of the knuckle 53, the external foreign matter or the rust of the knuckle 53 reaches the foreign matter discharge grooves 35 before reaching the seal portion 32 located immediately under the knuckle 53. Thus, the external foreign matter or the rust of the knuckle 53 which tends to intrude onto the seal portion 32 is discharged from the foreign matter discharge grooves 35 to the outside of the dust cover 10.

As described above, according to the dust cover 10 of this embodiment, the external foreign matter or the rust of the knuckle 53 which tends to intrude from the outside is discharged to the outside through the foreign matter discharge grooves 35, and therefore the accumulation of the external foreign matter or the rust of the knuckle 53 on the seal portion 32 does not occur. This can prevent wear of the seal portion 32 due to the contact of the external foreign matter or the rust of the knuckle 53 with the seal portion 32.

Moreover, according to the dust cover 10 of this embodiment, the foreign matter discharge grooves 35 are disposed obliquely with a necessary angle in the radial direction of the shaft 51b passed through the insertion hole 53e, and therefore breakage due to a twist of the dust cover 10 caused by fitting of the side surfaces of the two foreign matter discharge grooves 35 adjacent to each other into the notch 53a when the stud 51 swings can be prevented.

Next, a dust cover 10 according to a second embodiment of the present invention is described in detail with reference to the drawings.

Figure 6:
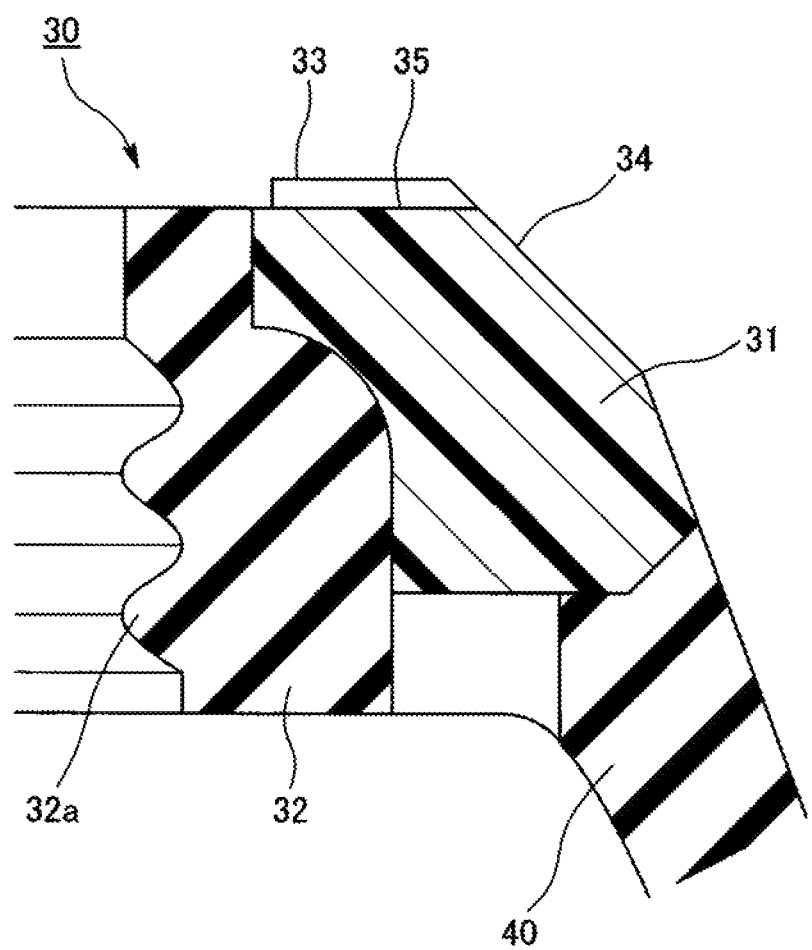
FIG. 6 is an enlarged cross-sectional view of a principal portion of a small diameter opening in a dust cover according to a second embodiment of the present invention.

More specifically, the dust cover 10 according to this embodiment is different from the dust cover 10 according to the first embodiment in that an inclined portion 34 is provided on the outside of the contact portion 33 as illustrated in FIG. 6.

The inclined portion 34 is formed by cutting out a part of a reinforcing ring 31 and inclines from the inner peripheral side to the outer peripheral side and from the upper side to the lower side.

As described above, according to the dust cover 10 of this embodiment, the foreign matter discharge grooves 35 incline from the upper side to the lower side, and therefore external foreign matter or rust of the knuckle 53 which tends to intrude from the outside can be more easily discharged to the outside.

The foreign matter discharge grooves 35 according to this embodiment are not limited to those in the aspect described above. The foreign matter discharge grooves 35 may have a linear shape or a curved shape from the inner peripheral side to the outer peripheral side. With respect to the direction where the foreign matter discharge grooves 35 are disposed in the radial direction, the foreign matter discharge grooves 35 may be formed radially or may be formed clockwise or counterclockwise.

Figure 7A:
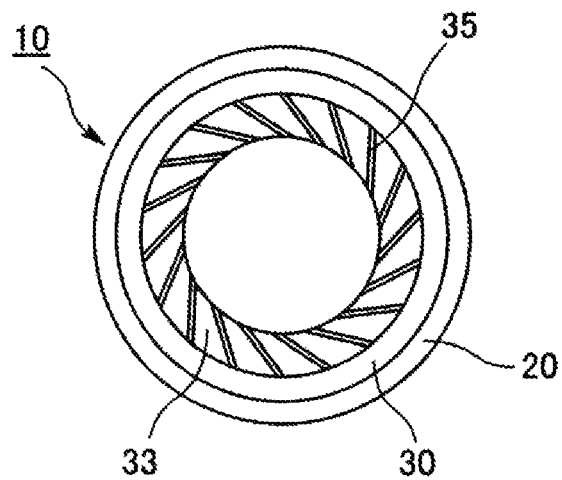
FIG. 7(a), FIG. 7(b), and FIG. 7(c) are plan views illustrating examples of the foreign matter discharge groove in the dust cover according to the embodiment of the present invention.
Figure 7B:
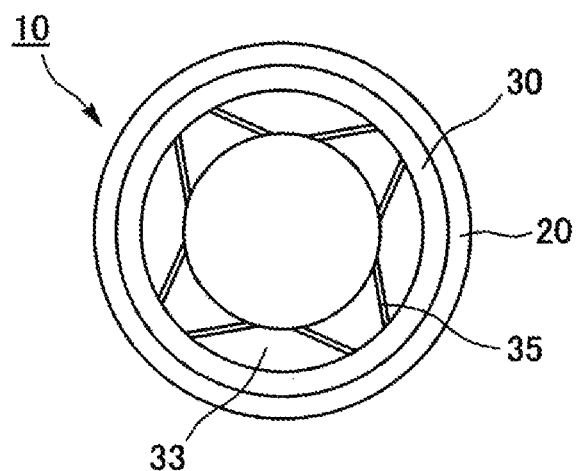
Figure 7C:
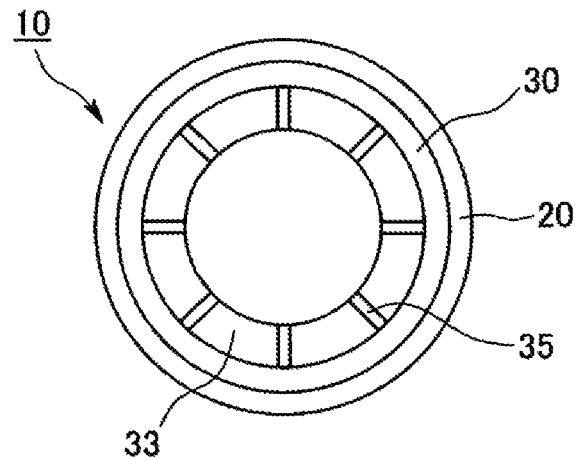
Figure 8:
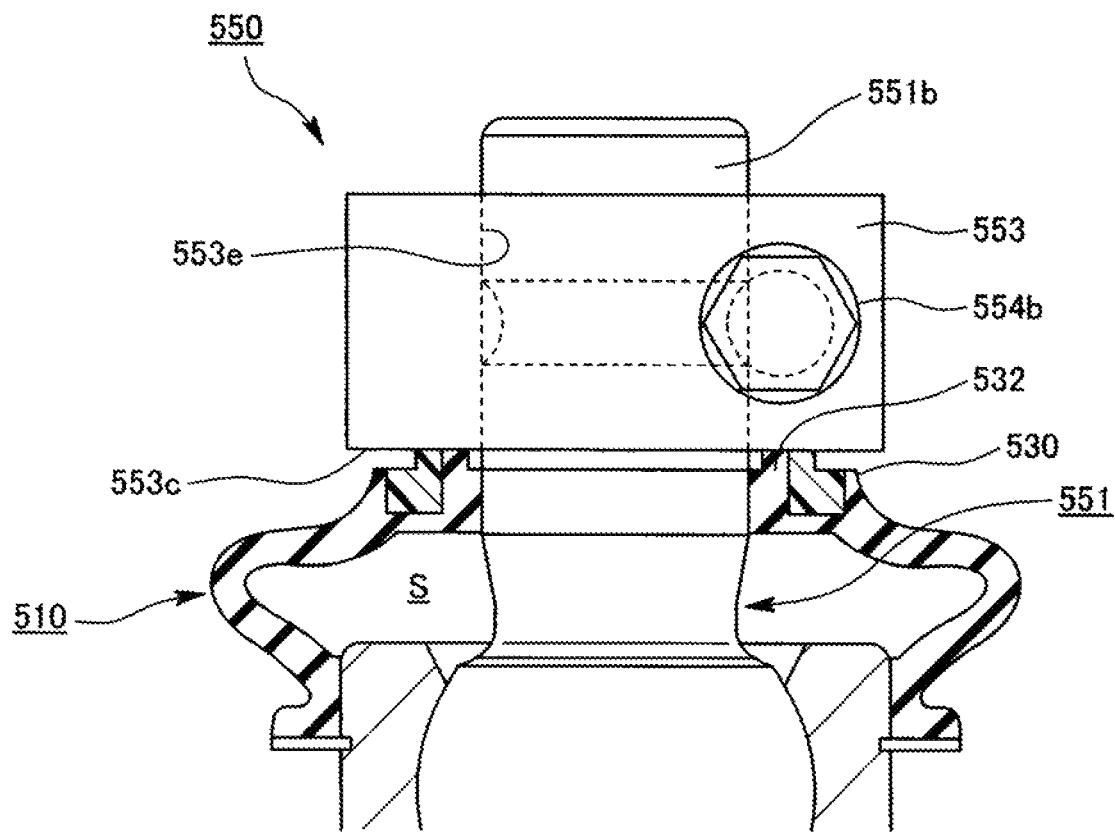
FIG. 8 is a cross-sectional view illustrating an attachment state of a dust cover according to a conventional technique.
Figure 9:
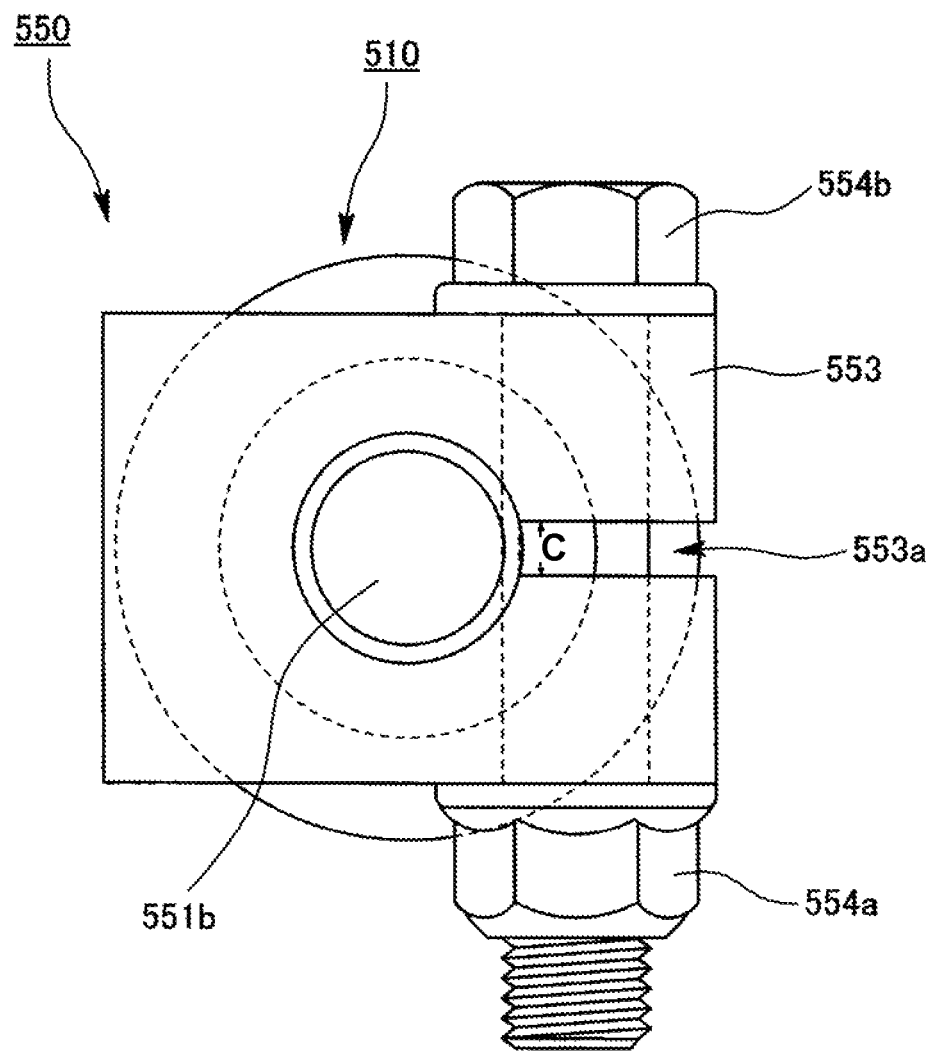
FIG. 9 is a plan view illustrating the attachment state of the dust cover according to the conventional technique.

As an example of the foreign matter discharge groove 35 having a shape different from the shape of the foreign matter discharge groove 35 according to this embodiment, the foreign matter discharge grooves 35 which are obliquely disposed with a necessary angle in the radial direction of the shaft 51b, linearly extend to the outer peripheral side from the inner peripheral side, and have a spiral shape as a whole as illustrated in FIG. 7(a), the foreign matter discharge grooves 35 in which the clockwise foreign matter discharge grooves 35 and the counterclockwise foreign matter discharge grooves 35 are combined as illustrated in FIG. 7(b), or the foreign matter discharge grooves 35 which are radially formed from the shaft center of the shaft 51b as illustrated in FIG. 7(c) may be acceptable.

The invention claimed is:

1. A dust cover which is attached to a ball joint in which a spherical portion in a stud having the spherical portion and a shaft is accommodated in a socket and a knuckle is fastened into the shaft, the dust cover comprising:
   a large diameter opening fixed to an outer peripheral surface of the socket;
   a small diameter opening attached to the shaft of the stud; and
   a film portion connecting the large diameter opening and the small diameter opening, wherein:
   the small diameter opening is provided with a seal portion in close contact with an outer peripheral surface of the shaft and a contact portion in close contact with the knuckle,
   foreign matter discharge grooves discharging external foreign matter which tends to accumulate on the small diameter opening to an outside area formed in the contact portion, and
   the foreign matter discharge grooves are disposed obliquely in a radial direction.

2. The dust cover according to claim 1, wherein the foreign matter discharge grooves have a spiral shape from an inner diameter direction to an outer diameter direction.

3. The dust cover according to claim 1, wherein an inclined portion inclined from a side of an outer diameter of the contact portion to a side of the large diameter opening is formed in the small diameter opening.

4. The dust cover according to claim 2, wherein an inclined portion inclined from a side of an outer diameter of the contact portion to a side of the large diameter opening is formed in the small diameter opening.

5. The dust cover according to claim 1, wherein the seal portion is configured to directly contact the outer peripheral surface of the shaft and a reinforcing ring is located about an outer periphery of the seal portion, the reinforcing ring including the contact portion that is configured to directly contact the knuckle, and
   wherein the contact portion of the reinforcing ring that is configured to directly contact the knuckle includes the foreign matter discharge grooves that are configured to discharge external foreign matter that accumulates on the small diameter opening to the outside area.

6. A dust cover which is configured to be attached to a ball joint in which a spherical portion of a stud having the spherical portion and a shaft is accommodated in a socket and a knuckle is fastened into the shaft, the dust cover comprising:
   a large diameter opening that is configured to be fixed to an outer peripheral surface of the socket;
   a small diameter opening configured to be attached to the shaft of the stud; and
   a film portion connecting the large diameter opening and the small diameter opening,
   wherein the small diameter opening is provided with a seal portion that is configured to directly contact an outer peripheral surface of the shaft and a reinforcing ring that is located about an outer periphery of the seal portion, the reinforcing ring including a contact portion that is configured to be in direct contact with the knuckle;
   wherein the contact portion of the reinforcing ring that is configured to directly contact the knuckle includes foreign matter discharge grooves that are configured to discharge external foreign matter that accumulates on the small diameter opening to an outside area, and
   the foreign matter discharge grooves are disposed obliquely in a radial direction.

* * * * *